United States Patent [19]

Margetts

[11] 4,200,340
[45] Apr. 29, 1980

[54] CONTROL VALVE ASSEMBLIES FOR HYDRAULIC BRAKING SYSTEMS

[75] Inventor: Hugh G. Margetts, Leamington Spa, England

[73] Assignee: Girling Limited, Birmingham, England

[21] Appl. No.: 935,971

[22] Filed: Aug. 22, 1978

[30] Foreign Application Priority Data

Aug. 23, 1977 [GB] United Kingdom ............... 35203/77

[51] Int. Cl.² ............................................. B60T 15/06
[52] U.S. Cl. ..................................... 303/6 A; 303/52
[58] Field of Search ................. 303/6 A, 52; 188/354, 188/16; 60/581, 550, 547 R, 591; 137/630.19, 77; 180/6.7, 6.2

[56] References Cited
U.S. PATENT DOCUMENTS 3,827,765  8/1974  Husted .................................. 303/52

Primary Examiner—Charles E. Frankfort
Assistant Examiner—Reinhard J. Eisenzopf
Attorney, Agent, or Firm—Scrivener, Parker, Scrivener and Clarke

[57] ABSTRACT

In a control valve assembly for a vehicle dual hydraulic braking system separate brake-applying valves in a common body are operable independently or simultaneously to cause hydraulic fluid from a distributor chamber to be supplied to one or both of a pair of outlets for connection to brakes on wheels on opposite sides of the vehicle. Each brake-applying valve comprises a valve member which is urged into engagement with a seating surrounding a respective outlet by means of a spring. An operating member for moving the valve member away from the seating in a brake applying direction is coupled to a respective brake pedal, and the operating member is also coupled to the valve member through a lost-motion connection.

5 Claims, 6 Drawing Figures

CONTROL VALVE ASSEMBLIES FOR HYDRAULIC BRAKING SYSTEMS

SPECIFIC DESCRIPTION

This invention relates to improvements in control valve assemblies for vehicle dual hydraulic braking systems of the kind commonly used on agricultural tractors and like vehicles in which separate brake-applying valves in a common housing are operable independently or simultaneously to cause hydraulic fluid from a distributor chamber in the housing to be supplied to one or both of a pair of outlets for connection to brakes on wheels on opposite sides of a vehicle.

The brake-applying valves can be operated simultaneously for retarding the vehicle or separately for steering.

Known control valve assemblies of the kind set forth are usually operated by a brake-applying mechanism suitably a yoke which acts at substantially the mid-point in its length on a valve-operating mechanism for controlling pressurisation of the distributor chamber and at opposite ends is coupled to different pedals, the yoke also being provided with spaced abutments for operating the brake-applying valves. When both pedals are operated simultaneously the yoke is moved bodily away from the housing to operate the valve-operating mechanism and allow both brake-applying valves which are unsprung, to open so that pressure fluid in the distributor chamber is supplied to both outlets. When one pedal is operated on its own the abutment for the brake-applying valve corresponding to that pedal moves away from the corresponding brake-applying valve, which can open and the other abutment closes the other brake applying valve. Further movement of that pedal in the same direction acts through the yoke to increase the closing force applied to the said corresponding brake-applying valve, and operates the valve-operating mechanism to pressurise the distributor chamber from which pressurised fluid is supplied through the open brake-applying valve to the brakes on that side of the vehicle.

According to our invention in a control valve assembly of the kind set forth each brake-applying valve comprises a valve member for engagement with a seating controlling a respective one of the outlets, and a first spring normally biassing the valve member into engagement with the seating, and a brake-applying mechanism operates a valve-operating mechanism for controlling pressurisation of the distributor chamber and also controls operation of the brake-applying valve in response to independent or simultaneous operation of a pair of pedals, the brake applying mechanism comprising means for operating the valve-operating mechanism when at least one pedal is operated, and an operating member for each brake-applying valve coupled to a respective pedal and coupled to the valve member of that respective brake-applying valve through a lost-motion connection.

In our invention both brake-applying valves are positively closed by the first springs and are opened by operation of a respective one of the pedals after the lost-motion has been taken up with the reaction on the brake applying mechanism being transmitted to the housing through an abutment on a respective operating member when the other pedal is operated on its own. Thus, the mechanism does not have to close the brake-applying valve which corresponds to a non-operated pedal.

The means for operating the valve-operating mechanism may comprise a yoke pivotally connected at opposite ends to the operating members and acting, at an intermediate point in its length, on the valve operating mechanism through a pivotal connection.

Conveniently however, these means comprise first and second levers which are pivotally connected to each other by a first pivot with one lever having an operating face acting on the valve-operating mechanism and the other lever being pivotally connected to a fixed point on the housing through a second pivot, the outer ends of one lever being pivotally connected to the operating member and the arrangement being such that movement of one or both levers in response to operation of one or both brake-applying valves causes the operating face to move relatively towards the housing and actuate the valve-operating mechanism.

One embodiment of our invention is illustrated in the accompanying drawings in which.

Figure 1:
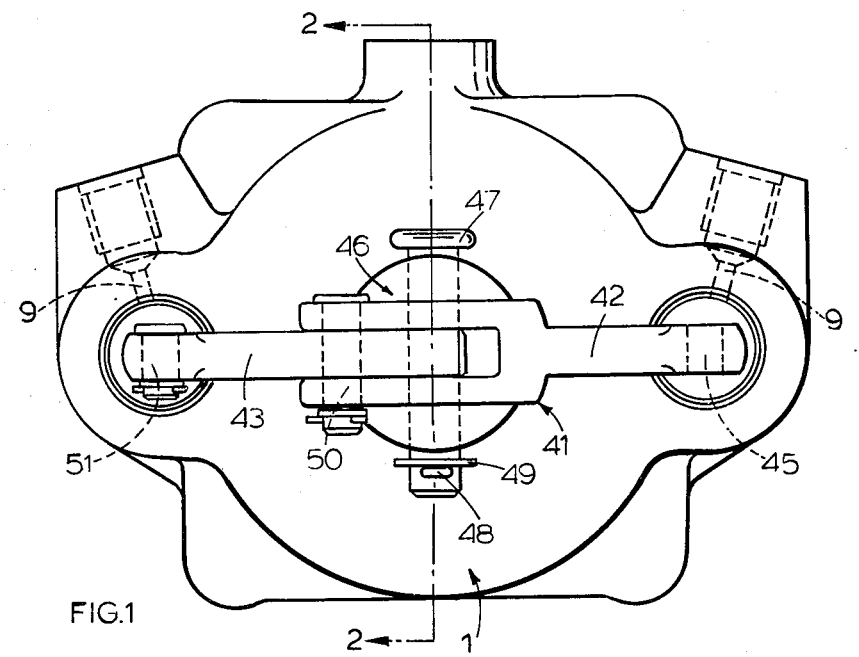
FIG. 1 is an end elevation of a control valve assembly for a vehicle hydraulic braking system.
Figure 2:
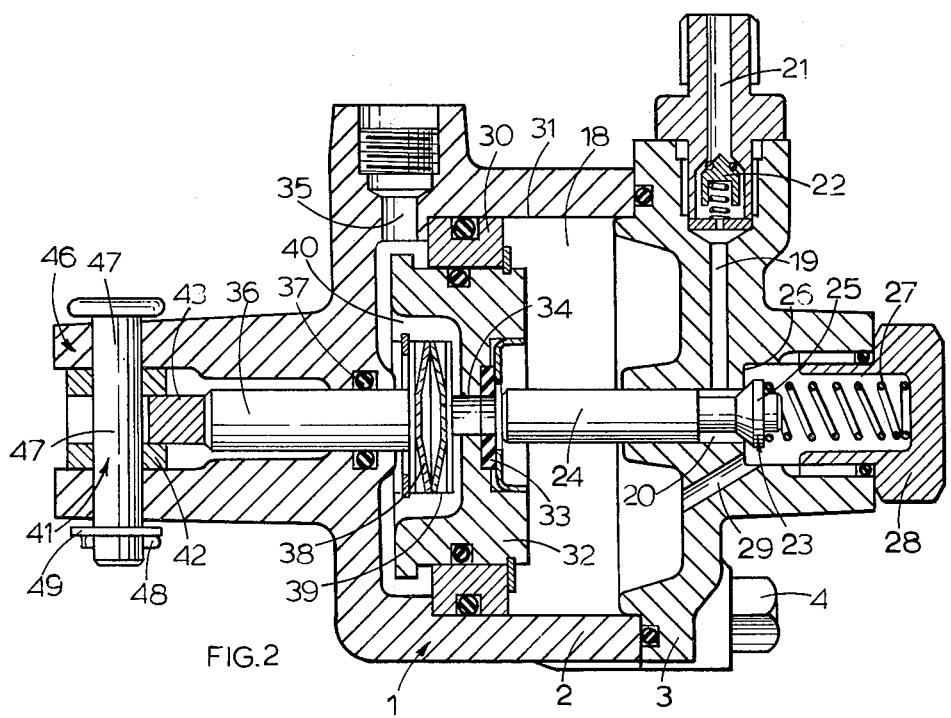
FIG. 2 is a longitudinal section through the valve assembly on the line 2—2 of FIG. 1.
Figure 3:
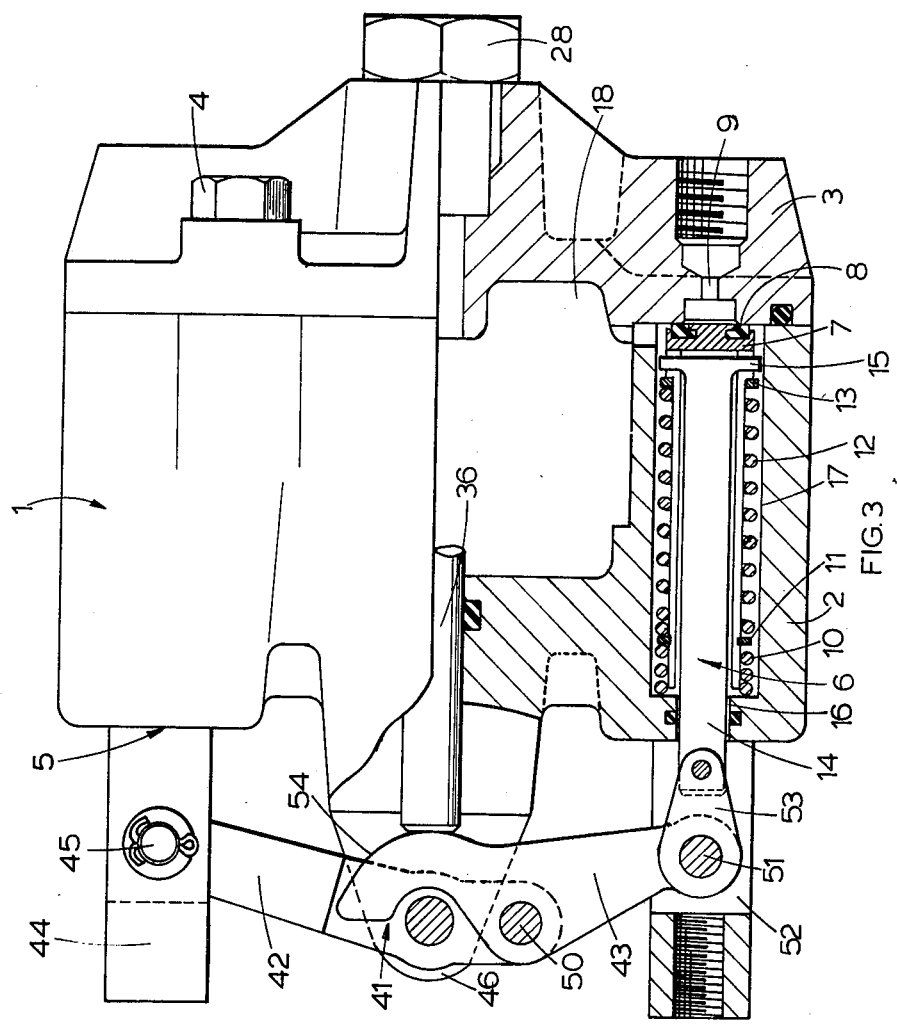
FIG. 3 is a plan containing a section through one of the brake-applying valves.

The control valve assembly of FIG. 1 comprises a housing 1 comprising a body 2 of cup-shaped outline, and a closure plate 3 which is clamped against a face at the open end of the body 2 by means of bolts 4.

A pair of brake applying valves 5 and 6 are mounted in the body 2, and each valve 5, 6 comprises a valve member 7 for engagement with a seating 8 surrounding a port 9 for connection to the brakes on one side of the vehicle. Each valve member is urged into engagement with the seating 8 by means of a spring 10 acting between an abutment 11 on the valve member 7 and the housing 2. A second spring 12 surrounds the valve member 7 and acts between the abutment 11 and an axially movable abutment 13. The valve member 7 is slotted axially to receive a valve operating member 14 having an inner end flange 15 which is normally spaced from the abutment 13 to define a lost-motion connection. The valve operating member 14 is guided for axial movement in a bore 16 in the housing 2. The valve member 7 and the operating member 14 are housed in a passage 17 which leads into a distribution chamber 18 defined by a cylindrical chamber in the body 2 which is closed by the plate 3.

The plate 3 includes a radial inlet passage 19 which connects a bore 20 at the centre of the plate 3 with a union 21 for connection to a high pressure pump through a one-way valve 22 which is housed in the inner end of the union 21.

Communication between the inlet passage 19 and the distributor chamber 18 is controlled by a pressure control valve 23. The control valve 23 comprises a plunger 24 which is guided to slide in the bore 20 and has an enlarged valve head 25 which is normally urged into a closed position in engagement with a complementary seating 26 in the plate 3 by means of a compression spring 27. The compression spring 27 is in abutment with a hollow closure member 28 for sealingly closing the outer end of the bore 20, and the interior of the closure member 28 is connected to the chamber 18 through an inclined passage 29.

A first annular outer piston 30 of substantial diameter works in the cylindrical bore 31 of the body 2 and a second annular inner portion 32 is mounted in the first piston 30 for relative sliding movement in a sealing manner through a limited distance. Both pistons 30 and 32 are normally located adjacent to the end of the bore 31 which is remote from the plate 3 and, in this position, the free end of the plunger 24 is spaced from a seating 33 surrounding a central opening 34 in the piston 32. The plunger 24 and the seating 33 define a recuperation valve which is open when the valve assembly is in an inoperative position so that the chamber 18 is in free communication with a passage 35 on the opposite side of the pistons 30 and 32 for connection to a reservoir for hydraulic fluid for supplying the pump.

An operating-rod 36 projects into the bore 31 through a seal 37 in the adjacent closed end of the body 2 and acts on the inner piston 32 through an assembly 38 of Belleville or similar resilient washers which are housed in a recess 39 in the piston 32. The recess 39 is formed with a series of circumferentially spaced flutes or ribs 40 which maintains communication between opposite sides of the piston 32 through the opening 34 and, at their inner ends, locate the Belleville washers 38 in positions.

Operation of a valve mechanism, comprising the recuperation valve and the pressure control valve 23, and the brake-applying valves 5 and 6 is controlled by a lever mechanism 41 which, in turn, is responsive to operation of a pair of pedals (not shown).

As illustrated the lever mechanism 41 comprises a first lever 42 and a second lever 43. The first lever 42 has a bifurcated inner end portion and is coupled at its outer end to an abutment member 44 for connection to one of the pedals by a pivotal connection 45 and at an intermediate point in its length the bifurcated portion is received within a bifurcated portion 46 at the end of the body 2 in which it is pivotally mounted for movement about a headed transverse pivot pin 47 which is passed through aligned openings in the limbs of the bifurcated portion of the lever 42 and the bifurcated portion 46 and is retained in position by a split pin 48 and washer 49. The free inner end of the first lever 42 at the outer end of the bifurcated portion is connected to an intermediate point in the length of the second lever 43 which it receives by means of a pivotal connection 50. The outer end of the second lever 43 is coupled through a pivotal connection 51 to an abutment member 52 for connection to the other of the pedals. Each pivotal connection 45, 51 also connects the respective lever to a link 53 which, in turn, is pivotally connected to the free end of the valve operating member 14. The free inner end of the second lever 43 lies inside the pivot pin 47 and is shaped to provide a curved operating face 54 for sliding engagement with the free outer end of the operating rod 36.

In the inoperative position shown in which both the brake applying valves 5 and 6, and the pressure control valve 23 are closed, the recuperation valve is open so that both the bore 31 and distributor chamber 18 and the brakes are in communication with the reservoir.

Figure 4:
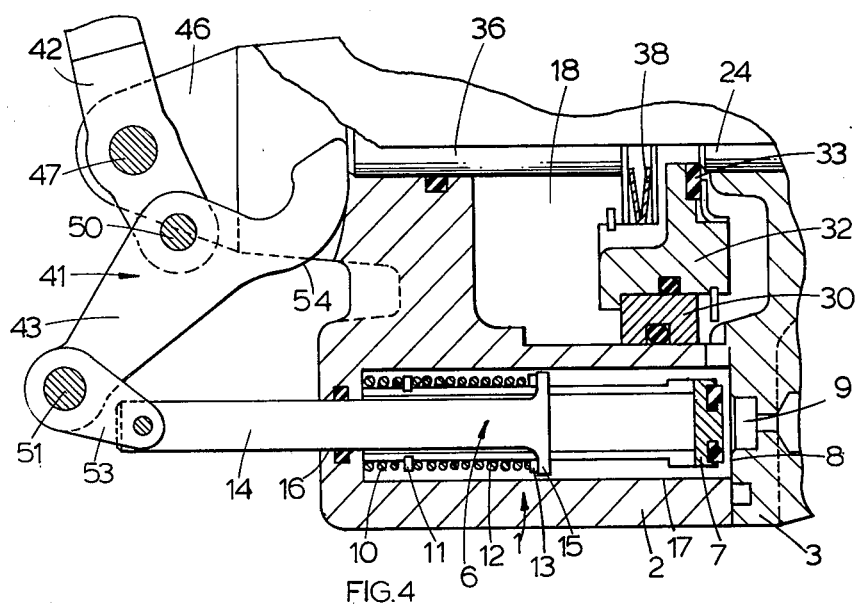
FIG. 4 is a portion of FIG. 3 showing the full stroke and with an abutment member omitted.
Figure 5:
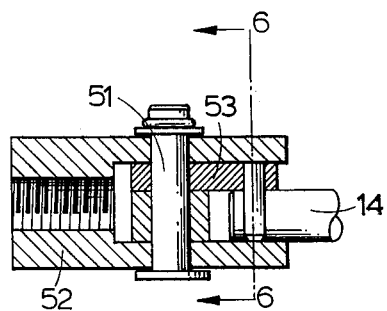
FIG. 5 is a longitudinal section normal to the section of FIG. 3, through the brake-applying valve connection.
Figure 6:
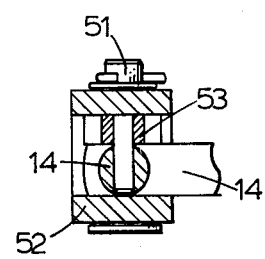
FIG. 6 is a section on the line 6—6 of FIG. 5.

When the brakes on opposite sides of the vehicle are to be applied simultaneously for vehicle retardation as shown in FIG. 4, both pedals are operated simultaneously to move the outer ends of the levers 42 and 43 away from the body 2 with the first lever 42 pivoting about the pivotal connection 47 and the second lever 43 pivoting about the pivotal connection 50 with the first lever 42. The brake applying members 14 are both withdrawn and, after the lost-motion has been taken up, move the valve members 7 away from the seatings 8 to open the brake-applying valves 5 and 6 against the force in the springs 10. When the free end of the valve members 7 engage with the housing 2, further movement of the operating member 14 takes place relative to the valve member 7 and the movable abutment 13 is carried with it by compression of the spring 12. The operating face 54 moves relatively towards the body 2 to apply an axially directed force to the free end of the operating rod 36. This moves the rod 36 into the body 2 acting through the Belleville washer 38 to advance the inner piston 32 with respect to the outer piston 30 until the valve seating 32 engages with the free end of the plunger 24. This closes the recuperation valve to isolate the chamber 18 from the reservoir. Further movement of the rod 36 in the same direction is then transmitted through the seating 33 to the plunger 24 which urges the head 25 away from the seating 26 so that fluid from the pump is admitted to the chamber 18 and from whence it passes to the wheel brakes through the open brake-applying valves 5 and 6. Under these conditions both levers 42 and 43 act as levers of the "first order".

By providing a common chamber 18 the pressure supplied to both sets of brakes is equalised to avoid differential wear of the linings.

When the brakes on one side of the vehicle are to be applied for steering, say those applied by the valve 6, the pedal coupled to the abutment member 52 is operated to move the second lever 43 angularly about the pivotal connection 50 and open the valve 6 as described above, also causing the operating face 54 to actuate the valve mechanism to pressurise the chamber 18 as described above. The reaction on the pivotal connection 50 tends to move the first lever angularly about the connection 47 and the abutment member 44 is urged into engagement with the housing 2. The other valve 5 remains closed by the effect of the force in the spring 10.

When the brakes on the other side of the vehicle are to be applied the other pedal is operated on its own to move the first lever 42 angularly about the fixed pivotal connection 47 and the load transmitted to the second lever 43 through the pivot 50 causes the operating face 54 on second lever 43 to operate the valve mechanism as described above and for the abutment member 52 to engage with the housing 2.

When the other pedal is operated on its own, the first lever acts as a lever of the "first order" but the second lever acts as a lever of the second order.

The distributor chamber 18 and the bore 31 on both sides of the pistons 30 and 32 are normally filled with fluid at atmospheric pressure in the inoperative position. Since the one-way valve 22 prevents a reverse flow of fluid to the pump, should the pump fail, the brakes can still be applied by pressurisation of the volume of fluid trapped in the bore 31 after the recuperation valve has closed and upon further movement of the piston 32 accompanied by the piston 30, irrespective of whether the pedals are operated simultaneously or independently.

In a modification the lever mechanism 41 may be replaced by a one-piece yoke pivotally connected at opposite ends to the operating members 14 and acting, at an intermediate point in its length, on the valve-operating mechanism.

I claim:

1. A control valve assembly for a vehicle dual hydraulic braking system comprising a housing provided with a distributor chamber, and first and second outlets for connection to brakes on wheels on opposite sides of said vehicle, separate brake-applying valves in said housing operable independently or simultaneously to cause fluid in said chamber to be supplied to one or both of said outlets, a valve-operating mechanism for controlling pressurisation of said distributor chamber, and a brake-applying mechanism for operating said valve-operating mechanism and for controlling operation of said brake-applying valves when at least one pedal of a pair of pedals is operated, wherein each brake-applying valve comprises a seating surrounding a respective one of said outlets, a valve member for engagement with said seating, a first spring for normally biassing said valve member positively into engagement with said seating, said spring acting between said housing and said valve member, an operating member, means for connecting said operating member to a respective one of said pedals, and means defining a lost-motion connection between said operating member and said valve member.

2. A control valve assembly for a vehicle dual hydraulic braking system comprising a housing provided with a distributor chamber, and first and second outlets for connection to brakes on opposite sides of said vehicle, separate brake-applying valves in said housing operable independently or simultaneously to cause fluid in said chamber to be supplied to one or both of said outlets, a valve-operating mechanism for controlling pressurisation of said distributor chamber, and a brake-applying mechansim for operating said valve-operating mechanism and for controlling operation of said brake-applying valves when at least one pedal of a pair of pedals is operated, wherein each brake-applying valve comprises a seating surrounding a respective one of said outlets, a valve member for engagement with said seating, a first spring for normally biassing said valve member into engagement with said seating, an operating member, means for connecting said operating member to a respective one of said pedals, and means defining a lost-motion connection between said operating member and said valve member, and wherein said first spring acts between said housing and a first relatively fixed abutment on said valve member, and a second spring acts between said first abutment and a second abutment normally to urge said second abutment against a shoulder on said valve member, said second abutment normally being spaced from a flange on said operating member to define said lost-motion connection.

3. A control valve assembly as claimed in claim 2, wherein said valve member is slotted axially to receive said operating member, and said flange is located at an inner end of said operating member which is adjacent to said seating.

4. A control valve assembly for a vehicle dual hydraulic braking system comprising a housing provided with a distributor chamber, and first and second outlets for connection to brakes on wheels on opposite sides of said vehicle, separate brake-applying valves in said housing operable independently or simultaneously to cause fluid in said chamber to be supplied to one or both of said outlets, a valve-operating mechanism for controlling pressurisation of said distributor chamber, and a brake-applying mechanism for operating said valve-operating mechanism and for controlling operation of said brake-applying valves when at least one pedal of a pair of pedals is operated, wherein each brake-applying valve comprises a seating surrounding a respective one of said outlets, a valve member for engagement with said seating, a first spring for normally biassing said valve member into engagement with said seating, an operating member, means for connecting said operating member to a respective one of said pedals, and means defining a lost-motion connection between said operating member and said valve member, and wherein an abutment member couples each said operating member to a respective pedal, and said abutment member is urged into engagement with said housing by the reaction on said brake applying mechanism when the other of said pedals is operated on its own.

5. A control valve assembly for a vehicle dual hydraulic braking system comprising a housing provided with a distributor chamber, and first and second outlets for connection to brakes on wheels on opposite sides of said vehicle, separate brake-applying valves in said housing operable independently or simultaneously to cause fluid in said chamber to be supplied to one or both of said outlets, a valve-operating mechanism for controlling pressurisation of said distributor chamber, and a brake-applying mechanism for operating said valve-operating mechanism and for controlling operation of said brake-applying valves when at least one pedal of a pair of pedals is operated, wherein each brake-applying valve comprises a seating surrounding a respective one of said outlets, a valve member for engagement with said seating, a first spring for normally biassing said valve member into engagement with said seating, an operating member, means for connecting said operating member to a respective one of said pedals, and means defining a lost-motion connection between said operating member and said valve member, and wherein said brake applying means comprise first and second levers, a first pivot for pivotally connecting said levers to each other, one of said levers having an operating face acting on said valve-operating mechanism, and a second pivot for pivotally connecting the other of said levers to a fixed point on the housing, an outer end of one lever being pivotally connected to said operating member, and the arrangement being such that movement of one or both levers in response to operation of one or both pedals to open one or both brake-applying valves causes said operating face to move relatively towards said housing and actuate said valve-operating mechanism.

* * * * *